(12) United States Patent
Harvey et al.

(10) Patent No.: US 8,814,099 B1
(45) Date of Patent: Aug. 26, 2014

(54) DEPLOYABLE MORPHING MODULAR SOLAR ARRAY

(75) Inventors: Thomas Jeffrey Harvey, Nederland, CO (US); Toby Justin Harvey, Nederland, CO (US)

(73) Assignee: MMA Design, LLC, Boulder, CO (US)

( * ) Notice: Subject to any disclaimer, the term of this patent is extended or adjusted under 35 U.S.C. 154(b) by 174 days.

(21) Appl. No.: 13/199,430

(22) Filed: Aug. 30, 2011

Related U.S. Application Data

(60) Provisional application No. 61/402,520, filed on Aug. 31, 2010.

(51) Int. Cl.
*B64G 1/44* (2006.01)
*B64G 1/66* (2006.01)

(52) U.S. Cl.
USPC ............... 244/172.6; 244/172.7; 136/245

(58) Field of Classification Search
CPC .......... B64G 1/222; B64G 1/44; B64G 1/443; B64G 1/641; B64G 1/002; B64G 1/007; B64G 1/645; B64G 1/1007; B64G 1/407; B64G 1/285; B64G 1/409; B64G 2001/1092; B64G 2001/643
USPC .......... 244/172.6, 172.7, 172.8, 158.1, 173.1, 244/173.3
See application file for complete search history.

(56) References Cited

U.S. PATENT DOCUMENTS

| | | | | |
|---|---|---|---|---|
| 3,677,508 | A | * | 7/1972 | Dillard et al. ............... 244/172.7 |
| 4,815,525 | A | * | 3/1989 | Readman ......................... 165/41 |
| 5,131,955 | A | * | 7/1992 | Stern et al. ..................... 136/245 |
| 5,296,044 | A | * | 3/1994 | Harvey et al. ................. 136/245 |
| 5,520,747 | A | * | 5/1996 | Marks ............................ 136/245 |
| 5,857,648 | A | * | 1/1999 | Dailey et al. ................ 244/172.6 |
| 6,147,294 | A | * | 11/2000 | Dailey et al. .................. 136/245 |
| 7,026,541 | B2 | * | 4/2006 | Heidrich ........................ 136/251 |
| 2003/0192994 | A1 | * | 10/2003 | Holemans ................. 244/158 R |
| 2008/0217482 | A1 | * | 9/2008 | Ellinghaus ................. 244/171.1 |
| 2009/0283132 | A1 | * | 11/2009 | Huang ........................... 136/245 |
| 2011/0315192 | A1 | * | 12/2011 | Swatek et al. ................ 136/245 |
| 2012/0325975 | A1 | * | 12/2012 | Boulanger ................. 244/172.8 |

* cited by examiner

*Primary Examiner* — Rob Swiatek
*Assistant Examiner* — George Andonyan
(74) *Attorney, Agent, or Firm* — Christopher J. Kulish

(57) ABSTRACT

A Deployable Morphing Modular Solar Array (DMMSA) for deploying Deployable Morphing Modular Solar Power Assemblies (DMMSPAs) from a spacecraft is provided. The DMMSA comprises a Root Staging and Deployment Mechanism (RSDM) mounted to a spacecraft. A plurality of petal assemblies are rotatably secured to the RSDM with each petal assembly having at least DMMSPA secured thereon and each DMMSPA having a slight V-configuration. A launch restraint assembly stacks and sandwiches the petal assemblies prior to deployment with the launch restraint assembly pre-loading each petal assembly's one or more DMMSPA into a substantially flat configuration. Upon release of the launch restraint assembly, the stacked and sandwiched petal assemblies rotate relative to the spacecraft and each petal assemblies DMMSPA elastically morphs from the substantially flat configuration into the slight V-configuration.

20 Claims, 14 Drawing Sheets

Deployable Morphing Modular Solar Array
(Stowed Condition)

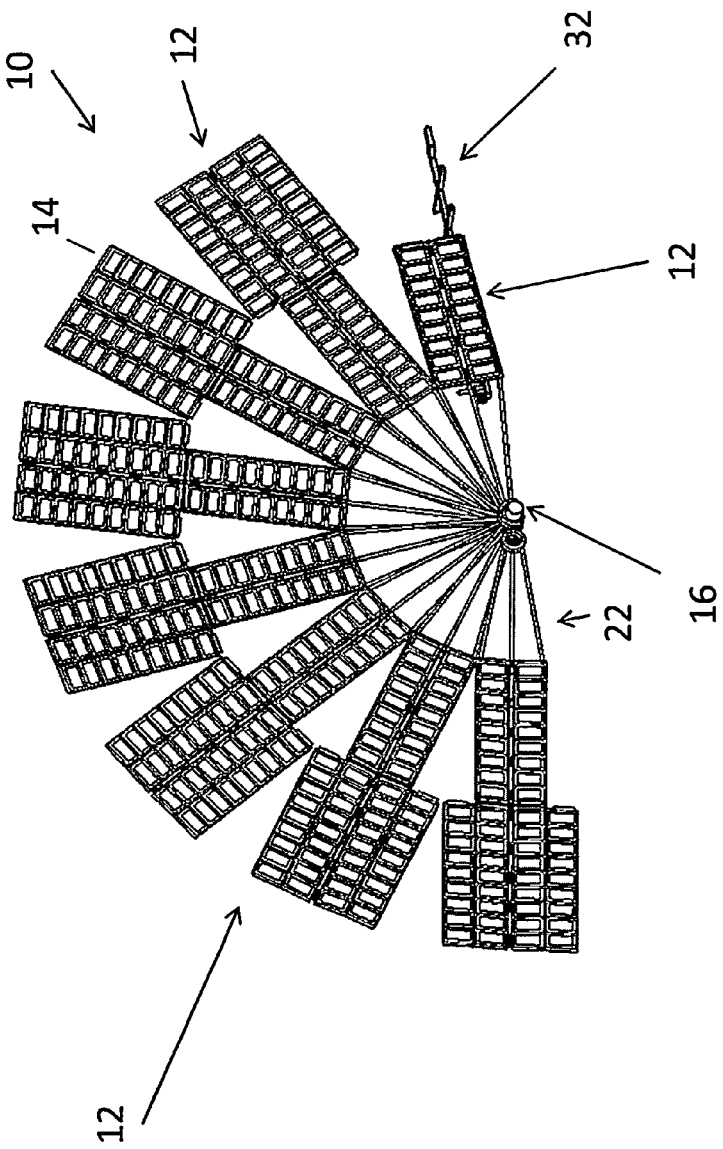

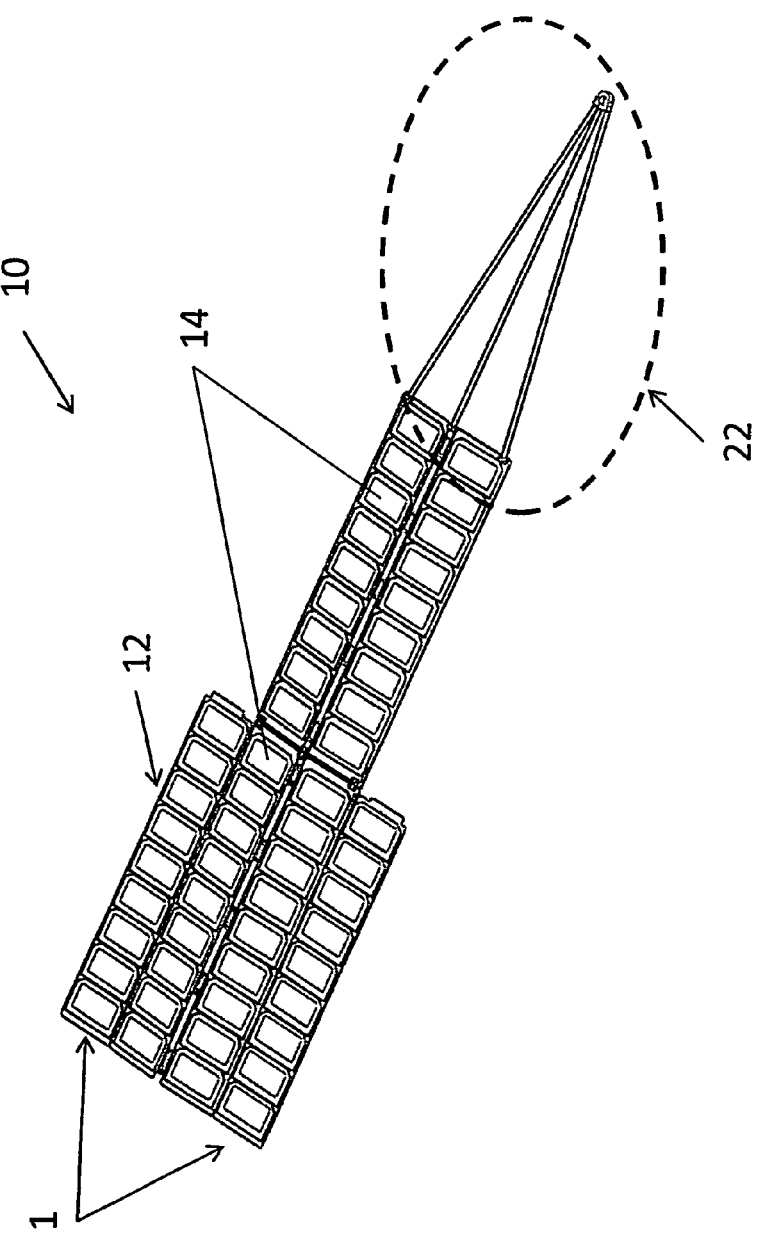

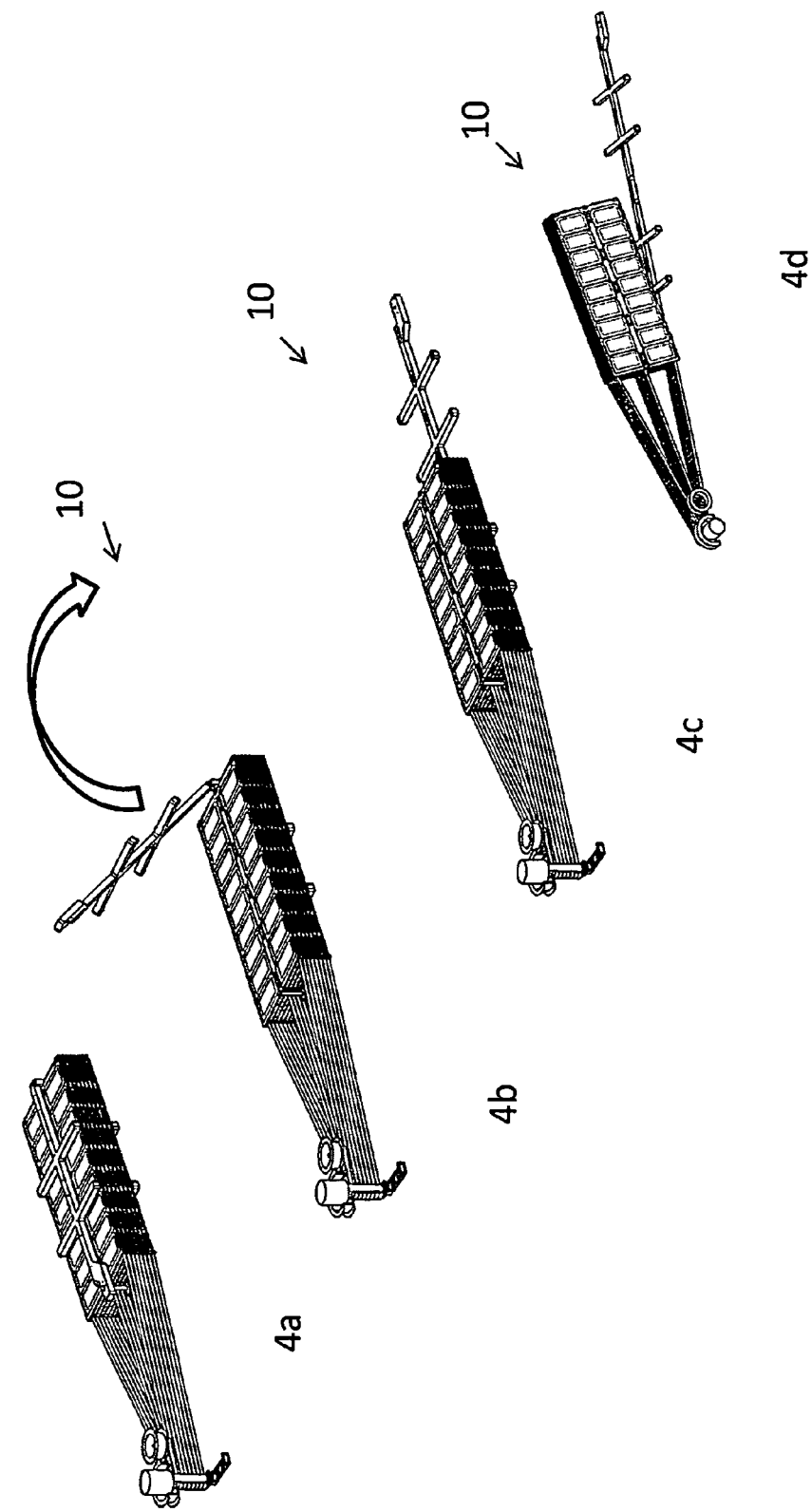

Deployment Sequence

Root Staging and Deployment Mechanism

V Bow Of Solar Panel

Deployable Morphing Modular Solar Power Assemblies
(DMMSA Stowed Stack Section)

Deployable Morphing Modular Solar Array
(Prior to Deployment)

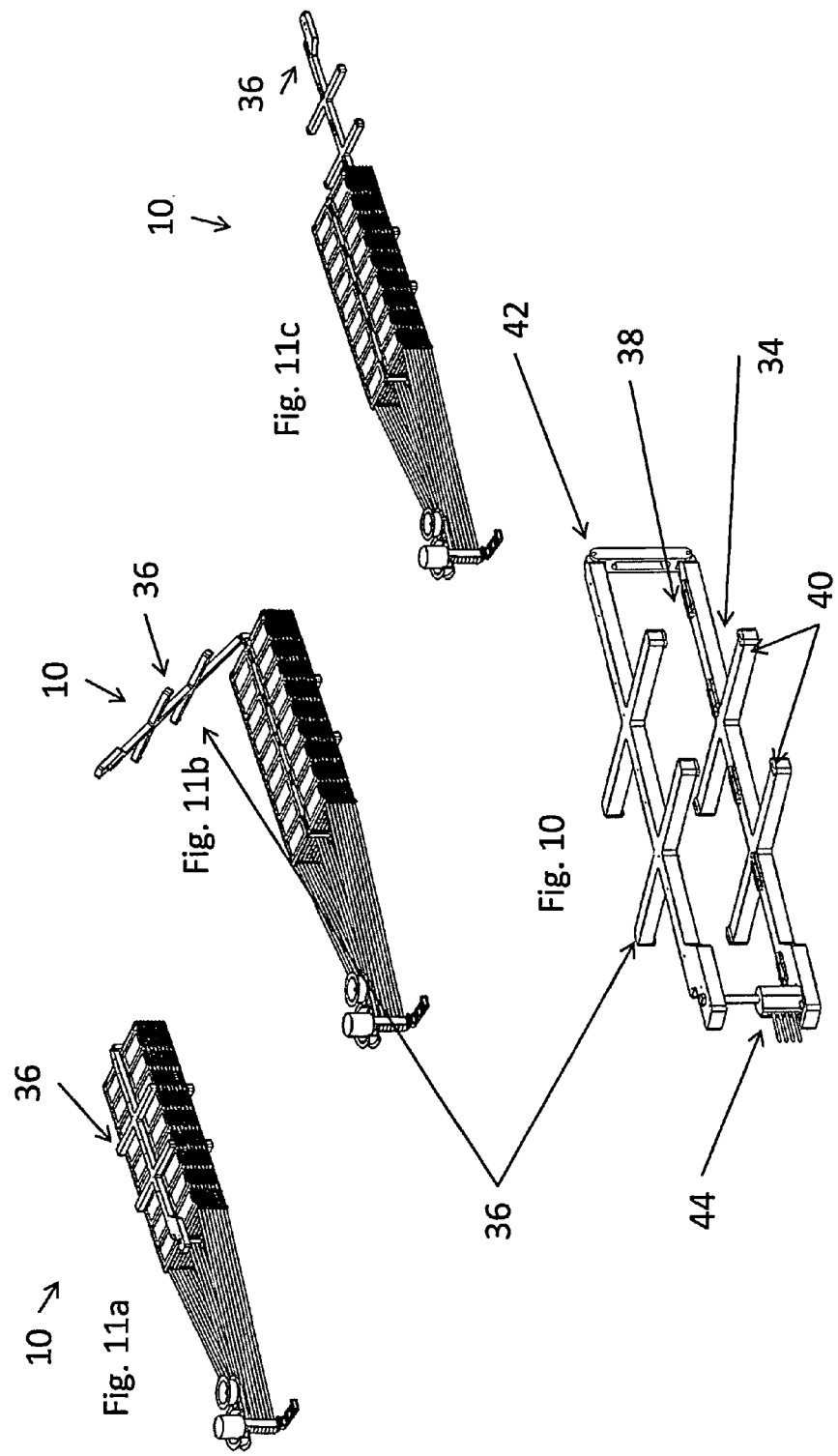

Petal Unfolding Sequence

Petal Latch and Lanyard

Petal Latch and Lanyards

DEPLOYABLE MORPHING MODULAR SOLAR ARRAY

The present application claims benefit of priority of provisional patent application Ser. No. 61/402,520, filed on Aug. 31, 2010, entitled "Solar Array Wing".

BACKGROUND OF THE INVENTION

1. Field of the Invention

This invention relates generally to a Deployable Morphing Modular Solar Array (DMMSA) and, more particularly, the invention relates to a subassembly of the solar array, the Deployable Morphing Modular Solar Power Assembly (DMMSPA) that makes the system modular, increases the deployed stiffness of the solar array, improves deployed first mode natural frequency of the system, and reduces overall manufacturing costs.

2. Description of the Prior Art

The current state-of-the-art (SOA) in solar arrays involves a highly customized design and testing effort for each spacecraft mission that does not use the significant design and production commonality existing among existing systems. The result of this approach is that each solar array is unique, costly, and long lead. In addition, this approach is contrary to what is required to support the commercial, Air Force and other agency needs, i.e., higher performance than current State of the Art (SOA), low cost inventory strategies of common components, rapid response to mission needs, and modular architecture that is semi-customizable and compatible across multiple missions.

Additionally, photovoltaic cell technology is evolving rapidly to the point that current solar array structural and mechanical systems do not optimize system level mass and volume performance potential. It is desirable to have a solar array that decreases production costs through modularity, significantly improves power to stowed volume ratio (W/m$^3$) and specific power (W/kg) over conventional SOA systems. In addition, it would be desirable to have a deployable solar array with revolutionary cost and performance improvements that is mechanically simple while meeting the requirements of currently available, as well as future solar cells.

The current solar array technology uses primarily panel based solar arrays that are poorly suited to leveraging the advantages of the next generation of Inverted-Meta-Morphic (IMM) multi junction thinned solar cells and their low areal density that are coming on the market in the near future.

Finally, the current SOA in ultra-high Performance deployable solar arrays uses membrane mounted solar cells and is designed for large spacecraft applications. There are two configurations, a dish-type fan fold or a blanket-type solar array. Both systems are mechanically complex and do not scale to smaller spacecraft applications.

SUMMARY

The present invention is a Deployable Modular Morphing Solar Array (DMMSA). The array is notionally simple, it uses a spring powered Root Staging and Deployment Mechanism (RSDM) that fan deploys structural elements similar to daisy petals that each perform a sequential secondary deployment. The stowed petals are folded when the system is stowed for launch on a spacecraft and unfold to a more structurally ideal configuration once deployed. The fan deployment moves the petals into position to be MORPHED-Deployed then locates them in positions ideal for gathering sun light. The petal assemblies are composed of a yoke that attaches to a Morphing Modular Solar Power Assembly, or assemblies (DMMSPA) that unfurl to form the petal assemblies upon beginning to fan deploy from the spacecraft. The DMMSA system is comprised of a Root Staging and Deployment Mechanism (RSDM) mounted to the spacecraft. The RSDM positions the stowed DMMSA 90 degrees from the spacecraft, staging it for fan deployment. Petal assemblies are attached to the RSDM by a yoke structure with each petal assembly having at least one DMMSPA secured thereon. Each DMMSPA elastically morphs to a slight V-configuration once deployed. This elastic flexing of the DMMSPA panel to a V cross section increases the area moment of inertia of the panel by orders of magnitude and hence the petal assemblies deployed natural frequency accordingly.

A launch restraint assembly secures at least one folded petal assembly prior to deployment with the launch restraint assembly pre-loading the petal's DMMSPA(s) into a substantially flat configuration. Upon release of the launch restraint assembly, the DMMSPA's that form each petal assembly elastically morph from the substantially flat configuration into the aforementioned V-configuration.

In addition, the present invention includes a method for deploying the petal assemblies from a spacecraft. The method comprises mounting the RSDM to the spacecraft and securing the yoke of the petal assemblies to the RSDM assembly. Deployment is accomplished by first swinging the un-deployed stack of petals to 90 degrees from the spacecraft then rotating the petal or petals away from the spacecraft in a sequential fan fashion.

BRIEF DESCRIPTION OF THE DRAWINGS

FIG. 2 is a perspective view illustrating an eight petal embodiment of the DMMSA, constructed in accordance with the present invention, being in a deployed condition;

FIG. 3 is a perspective view illustrating a petal assembly configured with two full DMMSPA's and two flip out solar panels, constructed in accordance with the present invention, with the petal assembly being in the deployed condition;

FIG. 10 is a perspective view illustrating the launch restraint system, constructed in accordance with the present invention;

FIGS. 11a-11c are perspective views illustrating the release sequence for the launch restraint system, constructed in accordance with the present invention;

DETAILED DESCRIPTION OF THE PREFERRED EMBODIMENTS

Figure 1:
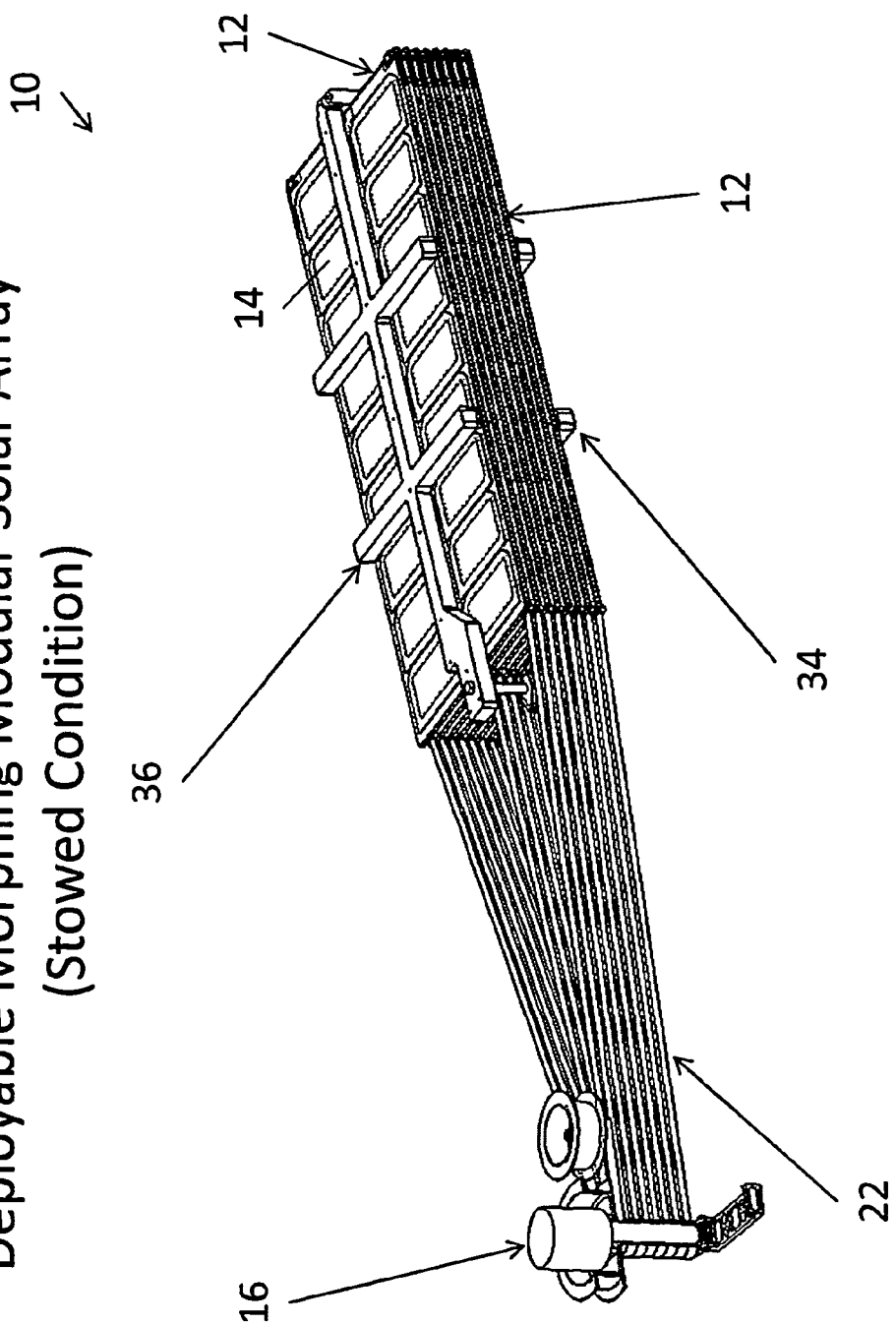
FIG. 1 is a perspective view illustrating the DMMSA, constructed in accordance with the present invention, being in a stowed condition.
Figure 4:
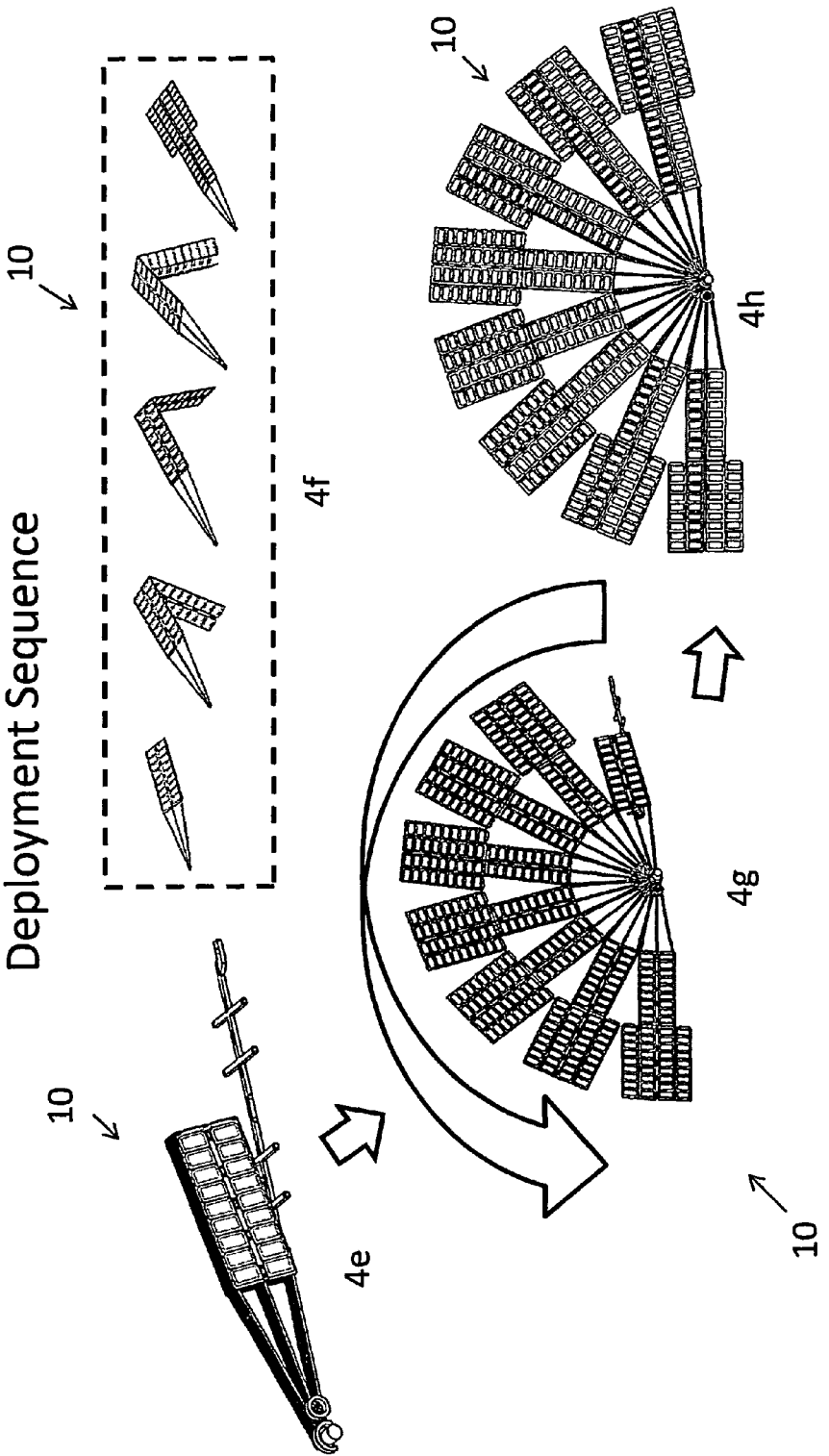
FIGS. 4a-4h are perspective views illustrating a deployment sequence for the DMMSA, constructed in accordance with the present invention.
Figure 5:
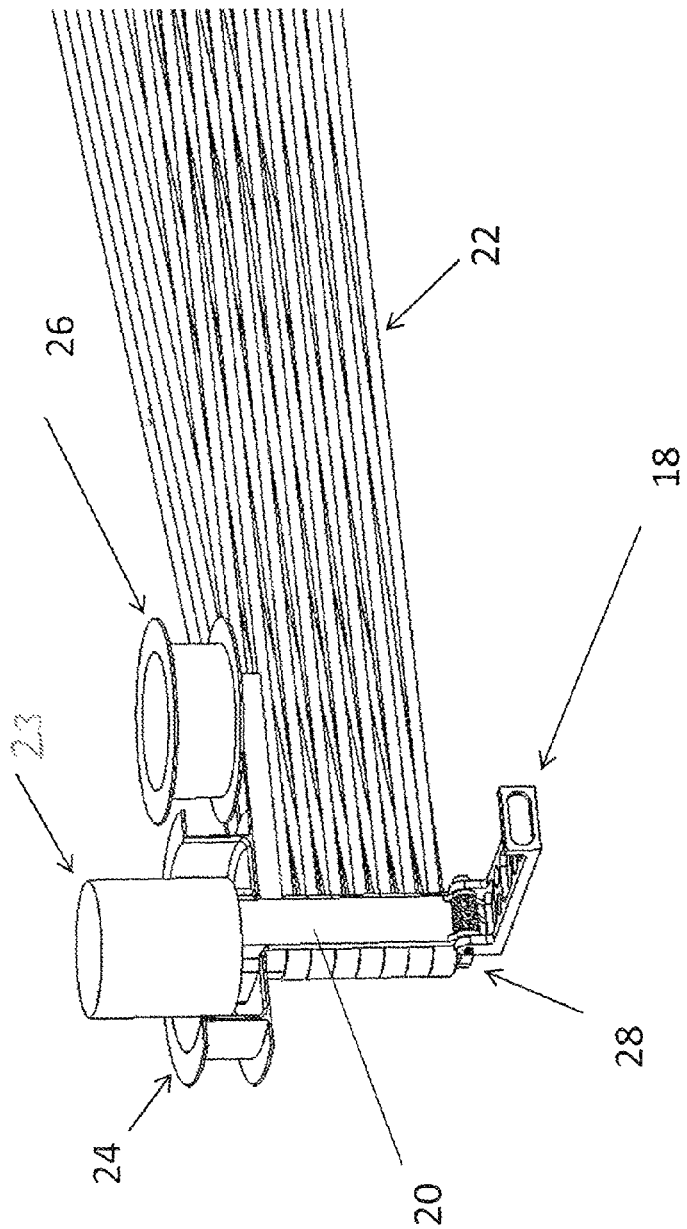
FIG. 5 is a perspective view illustrating the RSDM of the DMMSA, constructed in accordance with the present invention.
Figure 6:
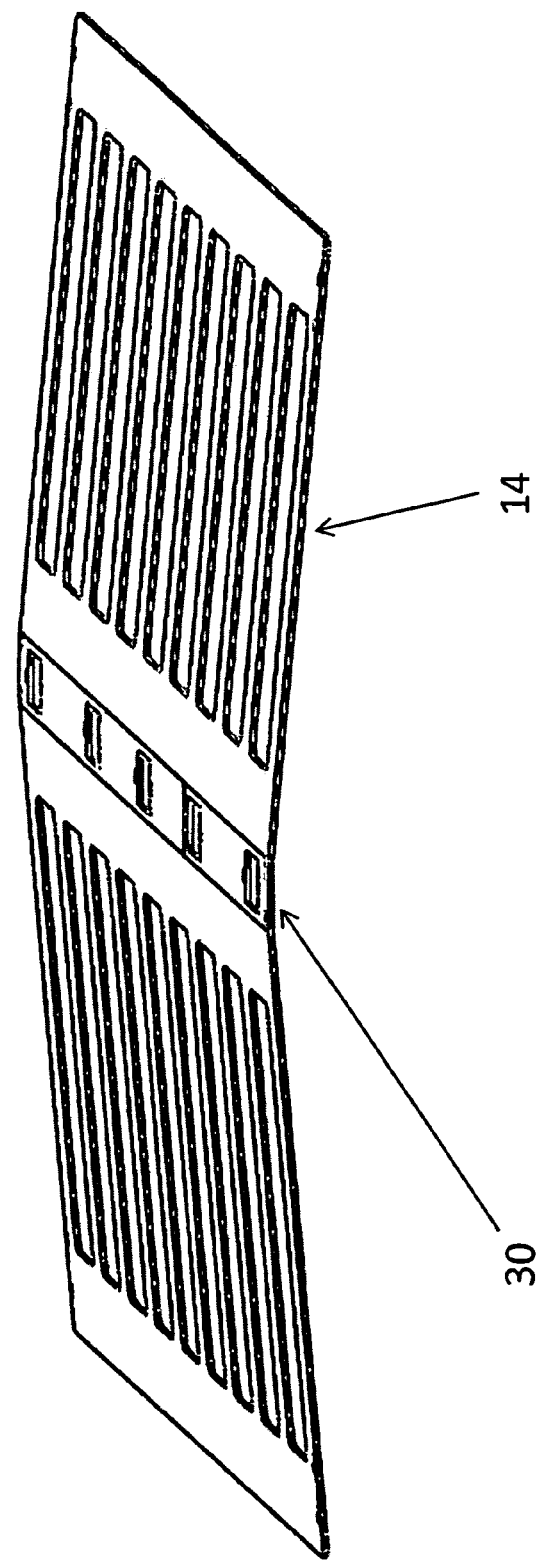
FIG. 6 is a perspective view illustrating a graphite and matrix panel that is the structural element of a DMMSPA, constructed in accordance with the present invention, with the solar panel having a V bow.
Figure 7:
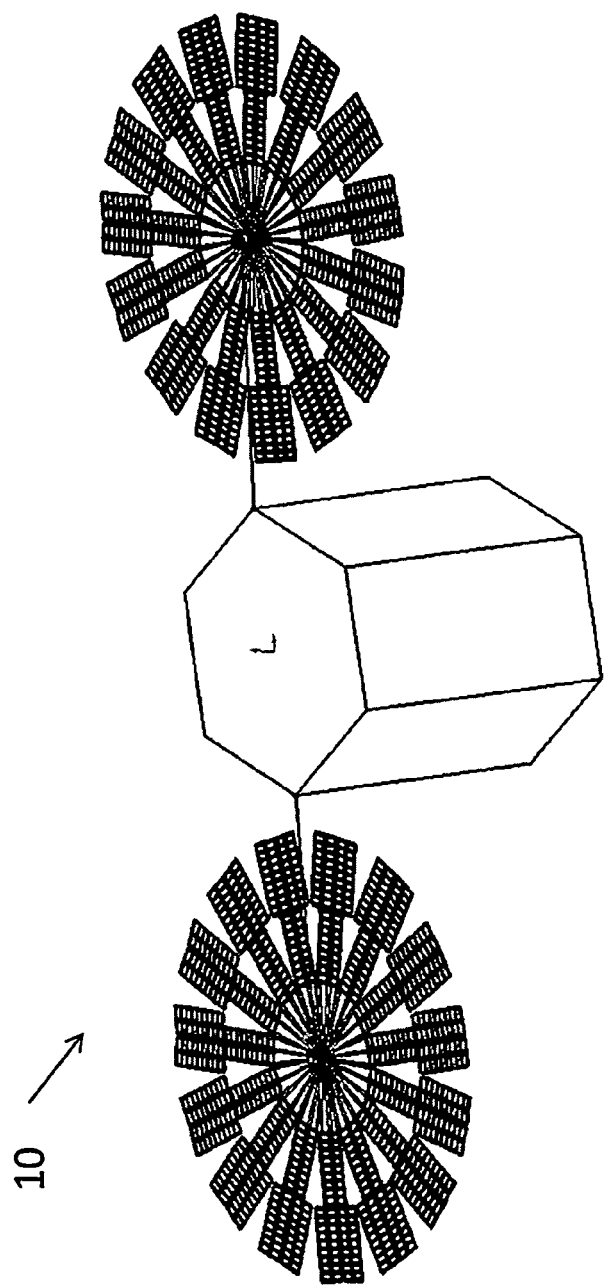
FIG. 7 is a perspective view illustrating a pair of DMMSA's in 16 petal assembly embodiments, constructed in accordance with the present invention, mounted to a spacecraft on a boom and each being configured in a full circle.
Figure 8:
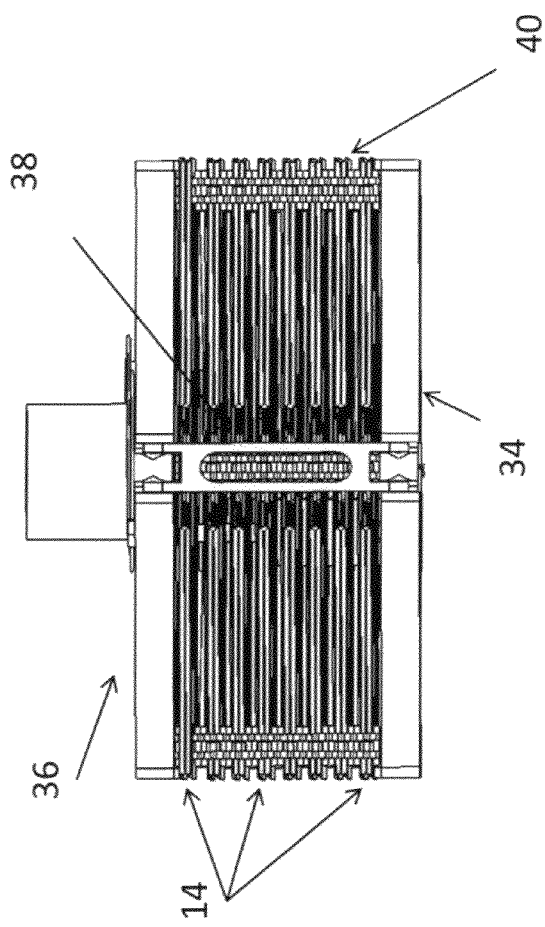
FIG. 8 is an elevational end view illustrating the flattened and stowed DMMSPA's of the DMMSA, constructed in accordance with the present invention.
Figure 9:
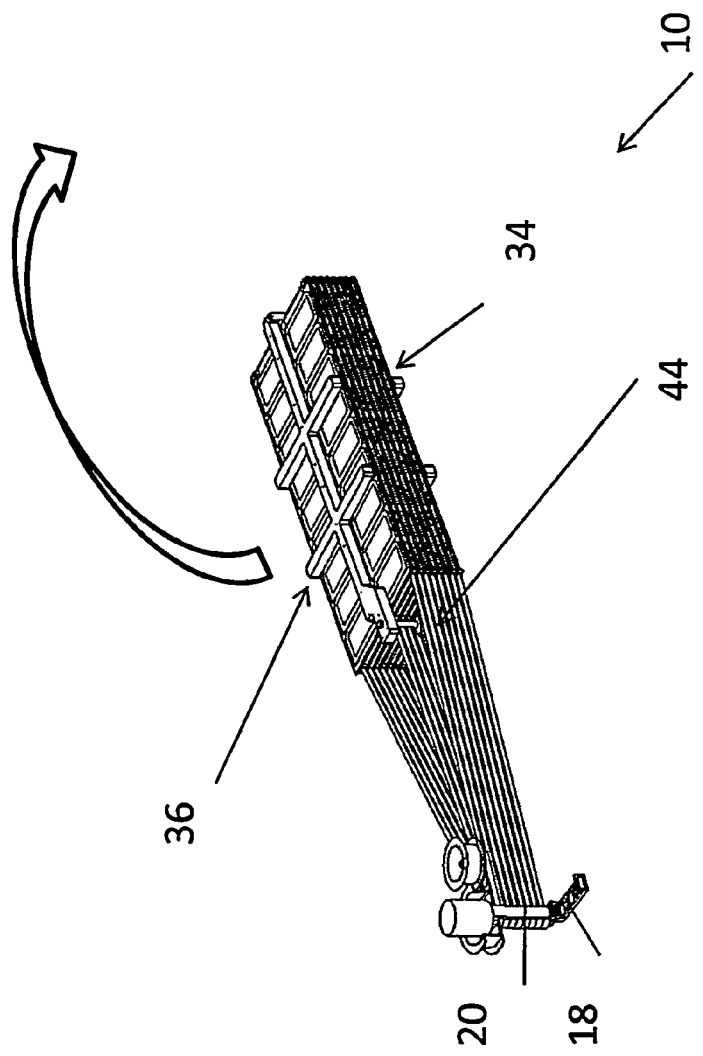
FIG. 9 is a perspective view illustrating DMMSA, constructed in accordance with the present invention, prior to deployment.
Figure 12:
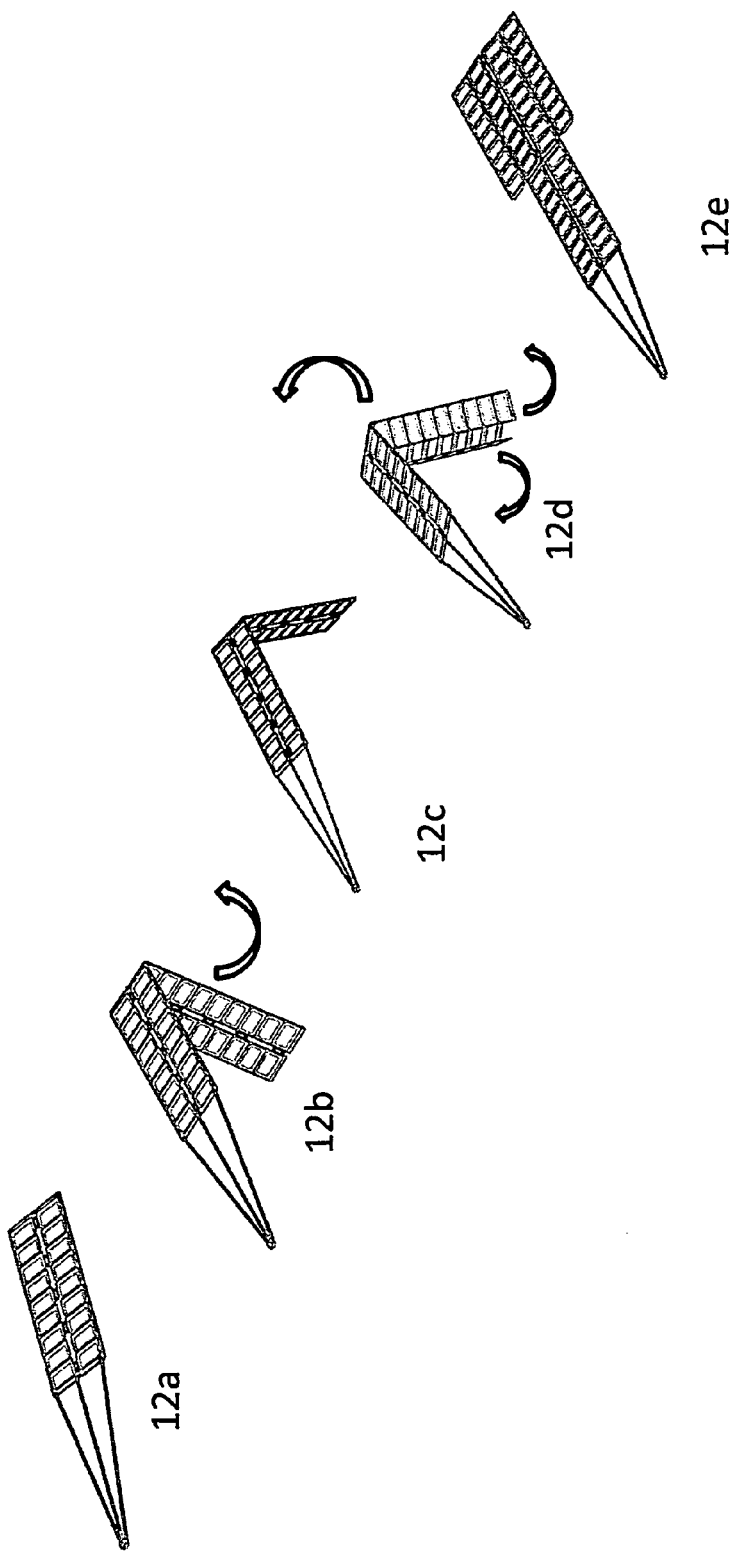
FIGS. 12a-12e are perspective views illustrating the petal unfolding, constructed in accordance with the present invention.
Figure 13:
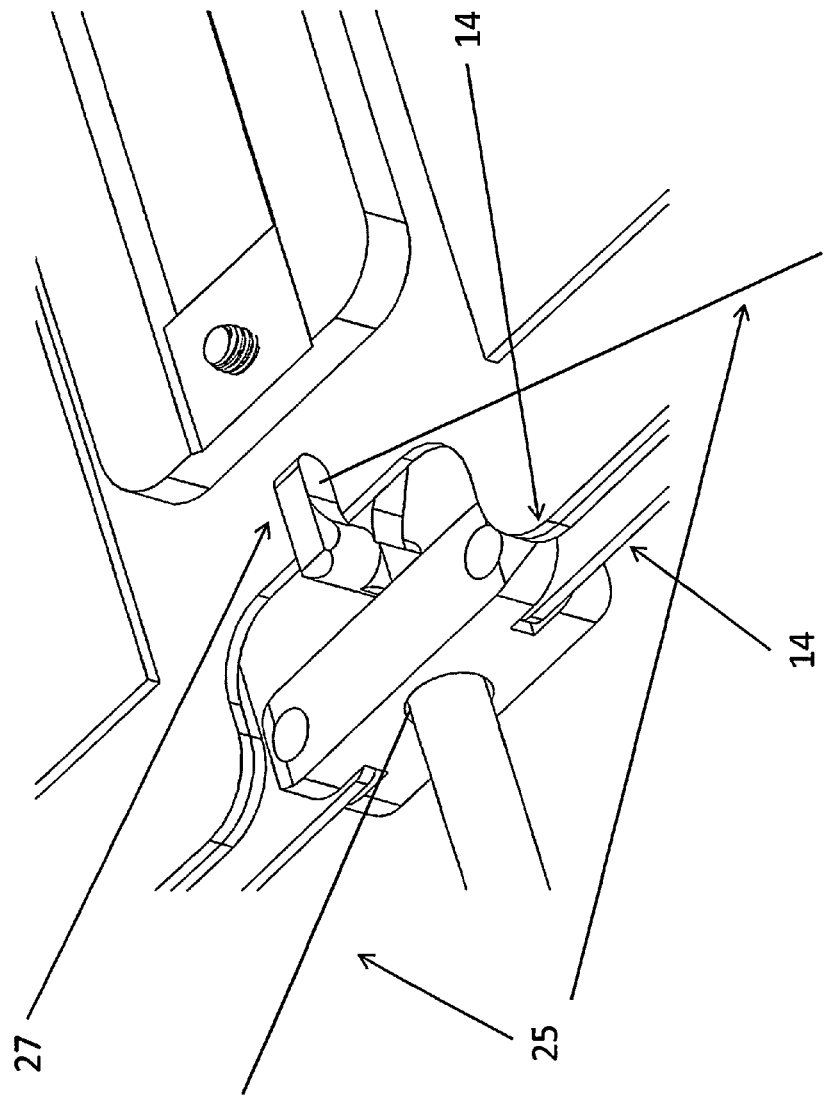
FIG. 13 is a perspective view illustrating a petal latch and petal lanyard, constructed in accordance with the present invention.
Figure 14:
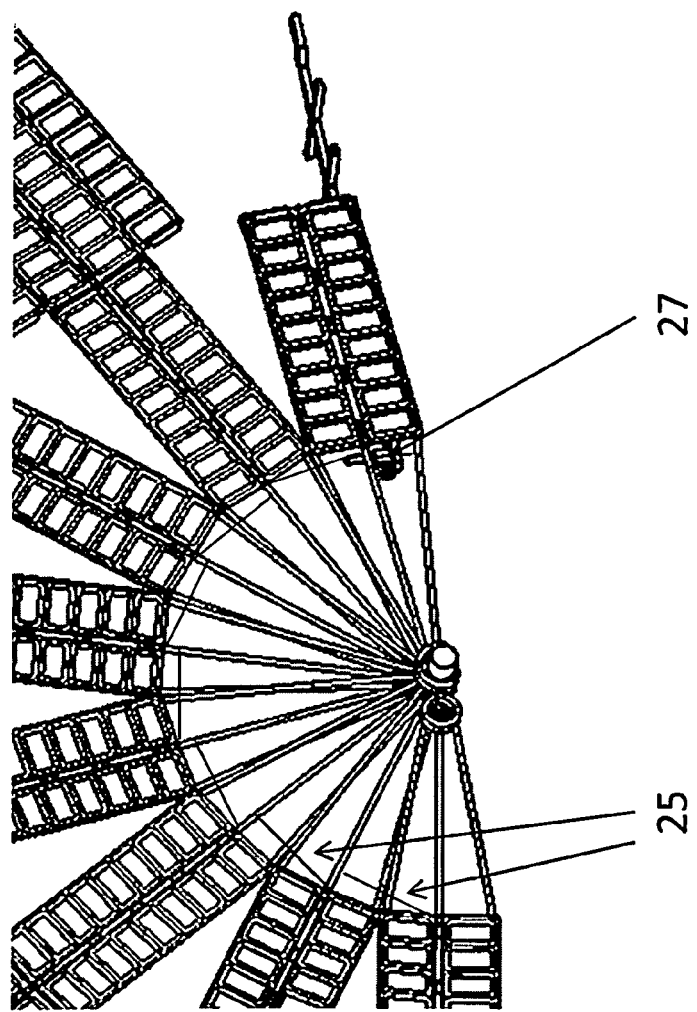
FIG. 14 is a perspective view illustrating the petal latch and the petal lanyard, constructed in accordance with the present invention.

As illustrated in FIGS. 1-14, the present invention is a deployable, structurally morphing, modular solar array system, indicated generally at 10, that increases the deployed stiffness of the modular petal assemblies 12, improving the system's 10 deployed first mode natural frequency, and reducing overall manufacturing costs and mass. As will be described in further detail below, the DMMSA 10 of the present invention uses pre-loaded and flattened DMMSPA panels 14 arranged in petal assemblies 12 (each petal assembly 12 has at least one DMMSPA 14) for surviving the ascent vibration environment. During the deployment sequence the flattening load is released allowing DMMSPA 14 panels that are a part of the petal assembly 12 to flex into a slight V bow. Initially the elastic motion into a V configuration breaks mechanical or electrostatic sticking, that is common once in the outer space environment, and then increases the stiffness of the petal assemblies 12 when they are deployed.

The DMMSA 10 of the present invention includes a Root Staging and Deployment Mechanism (RSDM) 16 that provides two functions. First, the RSDM 16 swings the stowed solar array away from the spacecraft into a staged position for fan deployment. Second, after staging is complete, the RSDM 16 deploys each petal assembly 12 sequentially from the stacked configuration which is followed by the elastic self-deployment of each petal assembly 12. The RSDM 16 includes a spacecraft interface bracket 18 securable to the spacecraft or a stand off boom mounted to the spacecraft and a clevis 20 that is pivotally connected to the bracket 18. When the DMMSA 10 is stowed and secured to the notional spacecraft, the clevis 20 is initially positioned 90 degrees to the spacecraft interface bracket 18. Once the system is released for deployment, the clevis 20 rotates to a position parallel to the spacecraft interface bracket 18 and hence the stowed solar array petals 12 approximately ninety (90°) into a staged position that is perpendicular to the mounting surface on the spacecraft for fan deployment.

In a preferred embodiment of the RSDM 16, a torsion spring 28 connects the spacecraft interface bracket 18 to the clevis 20 biasing the clevis 20 to rotate to a position parallel to the spacecraft interface bracket 18 locating the stowed petals 12 to a position perpendicular to the spacecraft mounting plane. In a preferred embodiment this motion is damped by a viscous rotary damper 23 known to a person skilled in the art. Attached to the clevis 20 is at least one petal yoke 22. The RSDM 16 includes a constant force spring mounted to an output drum 24 and a storage drum 26 to create the torque for deploying the petal assemblies 12 and hence the individual DMMSPAs 14, as will be described in further detail below.

The RSDM 16 of the DMMSA 10 of the present invention deploys the petal assemblies 12 using multi-leaf constant force springs. The constant force springs develop the torque that deploys the first petal assembly 12 which then pulls subsequent petal assemblies 12 sequentially through petal to petal lanyards. Once fully deployed the constant force springs provide sufficient torque to keep the petals 14 of the DMMSA 10 deployed. The torque produced by the RSDM 16 can be fine-tuned by adding or subtracting constant force springs. Actual deployment of the petal assemblies 12 will be described in further detail below.

Each petal assembly 12 of the DMMSA 10 of the present invention is attached to the RSDM clevis 20 with a yoke bracket 23. As mentioned above, in a launch state, the petal assemblies 12 are folded, stacked and held compressed flat so each individual DMMSPA 14 panel is held preloaded and flat. Preloading of the elements of a solar array that support solar cells prevents vibration induced gapping and the spike loads caused by this phenomena. These spike loads can damage solar cells. Conventional solar array systems utilize compressed foam or springs to preload the solar array panels that support the solar cells when stowed adding complexity and mass. The shallow V-shape of the deployed individual DMMSPA panels 14 provides the DMMSA 10 a stable preload in the launch configuration because the DMMSPA panels 14 are elastically deformed to a flat configuration when the DMMSA 10 is stowed. Additionally, the foam often used in conventional systems relaxes during stowage, thus increasing the risk of preload loss and limiting long-term stowage. The use of the elastic deformation of the flattened DMMSPA panels 14 of this invention, when stowed, optimizes mass and cost performance by having fewer parts and is structurally stable.

Each individual DMMSPA structural panel 14 of the DMMSA 10 of the present invention is constructed of cyanate ester and carbon fiber (CFRP) with an integral crease 30 in the center. The thickness of the panel 14 is determined by the inertial loads applied to the system during the rocket launch vibration environment. When the petal assemblies 12 and the individual DMMSPA panels 14 are stowed, the center crease 30 in each individual panel 14 allows the petal assemblies 12 to be elastically flattened. In the flat configuration, the petal assemblies 12 stow efficiently and preload the stowed system. Once the individual DMMSPA is 14 no longer under compressive pressure, it returns to its shallow V-shape. This "morphing" is an approximately ten (10°) degree bend in the individual panel 14 but increases the moment of inertia of the section as previously noted.

The petal assemblies 12 of the DMMSA 10 of the present invention are stacked and sandwiched under a preload by a launch restraint assembly 32. In a preferred embodiment, the launch restraint assembly 32 includes the petal assemblies 12 positioned between a vehicle interface spider 34 on the bottom of the stacked petal assemblies 12 and a launch restraint swing spider 36 on the top of the stacked petal assemblies 12 applying a compressive load through multiple stacks of cup-cone elements 38 attached to the vehicle interface spider 34, all the DMMSPA's 14, and the swing spider 36. When stowed for launch, the DMMSPA's 14 of each petal assembly 12 and its integral cups and cones 38 located in several places along its axial center line transfer shear loads as well as axial loads determinately securing each DMMSPA 14 to the spacecraft through the launch restraint assembly 32. In the stowed configuration, the petal assemblies 12 are additionally stabilized with a multitude of rubber snubbers 40. When stowed and flattened the petal assemblies 12 form a pre-loaded system due to the elastic forces required to flatten the individual DMMSPA's 14.

In addition, the launch restraint assembly 32 of the DMMSA 10 of the present invention includes a spider link member 42 that is positioned between the vehicle interface spider 34 and the swing spider 36 on a distal end of the petal assemblies 12. A hinge connection between the spider link 42 and the swing spider 36 allows the swing spider 36 to be rotated in a general direction away from the stacked petal assemblies 12 in order to stage and deploy the petal assemblies 12 and the individual DMMSPA's 14. A hold down and release bolt 44 is positioned between the vehicle interface spider 34 and the swing spider 36 on the near end of the petal assemblies 12. In conjunction with the spider link member 42, the hold down and release bolt 44 holds the petal assemblies 12 sandwiched between the vehicle interface spider 34 and the swing spider 36. The launch restraint assembly 32 keeps the folded petal assemblies 12 sandwiched, elastically compressing the individual DMMSPA panels 14, and maintaining a stable long-term preload on the DMMSPA's 14 during storage and launch.

The sequence for deploying the petal assemblies 12 and hence the individual DMMSPA's 14 of the DMMSA 10 of the present invention will now be described. As understood by those persons skilled in the art that the deployment sequence described herein is a preferred manner of deployment and other deployment sequences are within the scope of the present invention.

First, as described above, the petal assemblies 12 are in the pre-loaded stored condition mounted to the spacecraft by the RSDM 16 and the launch restraint assembly 32. When the spacecraft reaches a desired position of orbit or travel, the hold down and release bolt 44 is broken or otherwise damaged by known means such as applying power to a heater circuit that breaks the hold down and release bolt 44 thereby releasing the swing spider 36 from the vehicle interface spider 34. The release is low shock and is not instantaneous, thus making it immune from spurious spikes of current due to electrostatic discharge. The released, un-loaded individual DMMSPA's 14, and thus, the petal assemblies 12, then relax into the V-shape thereby separating the cup-cones and causing the swing spider 36 to pivot away from the petal assemblies 12. The petal assemblies 12 are now ready to be staged into the deployed condition.

In order to move the petal assemblies 12 into the deployed condition, the RSDM 16 rotates the stacked petal assemblies 12 approximately ninety (90°) degrees by torque from the torsion spring between the vehicle interface bracket 18 and the clevis 20 of the RSDM 16 to correctly position the petal assemblies 12 relative to the spacecraft. The petal assemblies 12 are now ready to be deployed with the individual DMMSPA's 14 in each petal assembly 12, one at a time, flipping outward and unfolding. The actual amount of flipping and unfolding of the individual petals 12 is dependent on the actual number of individual DMMSPA's 14 that form each petal assembly 12. In a preferred embodiment, the staging and fan deployment of the petal assemblies 12 is damped with dampers to limit speed.

As the first petal assembly 12 rotates away from the spacecraft, at a predetermined point, such as approximately eleven (11°) degrees, a petal to petal lanyard 25 begins pulling the next petal assembly 12 from the stowed stack of petal assemblies 12, releasing a petal latch 27 on the first petal assembly 12 that allows the petal 14 to unfold. Initially, the remaining petal assemblies 12 remain stationary through a ball detent located on each yoke bracket 23 in the RSDM 16. Release of each petal's petal latch 27 allows the petal assembly to unfold. Once the first petal assembly 12 unfolds and flips, it is fanned away from the remaining stacked petal assemblies 12. DMMSPA 14-to-DMMSPA 14 unfolding occurs when the petal latch 27 on each petal assembly 12 is released and petal deployment continues until full deployment. Each adjacent petal assembly 12 is tethered with the petal to petal lanyards 25 to the next adjacent petal assembly causing each successive petal assembly 12 to fan outward with this procedure continuing until all petal assemblies 12 are fanned away from the spacecraft. Now, the petal assemblies 12 create a deployed wing comprised of individual DMMSPA's 14 for powering the spacecraft and/or the spacecraft's equipment. It should be noted that the DMMSA 10 of the present invention is simple to reset by folding and rotating the petal assemblies 12 and replacing the hold down and release bolt 44 with a new replacement bolt.

The DMMSA 10 of the present invention advances the SOA of deployable photovoltaic power systems. There are many potential benefits and impacts to space missions by using the DMMSA 10. The benefits and impacts include, but are not limited to:
1) Lower costs for small satellites requiring high power;
2) Enhancing the capability and utility of satellites;
3) Improving the mass fraction for payloads;
4) Allocating less volume for solar arrays on the stowed spacecraft;
5) Increasing power in the current volume allocation;
6) Varying power by using different number of petal assemblies; and
7) Rapidly reconfiguring for multiple power needs in support of rapidly deployable space missions.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:
1. A deployable morphing modular solar array (DMMSA), the DMMSA comprising:
   a root staging and deployment mechanism (RSDM) mountable to a spacecraft;
   a plurality of petal assemblies, each petal assembly rotatably secured to the RSDM for rotation about an axis, each of the plurality of petal assemblies adapted to rotate about a different location along the length of the axis, each petal assembly having at least one deployable morphing modular solar power assembly (DMMSPA) panel, and each DMMSPA panel having an undeformed V-configuration in a cross-sectional plane that is perpendicular to a radius extending from the axis; and
   a launch restraint assembly for stacking and sandwiching the at least one DMMSPA panel associated with each of the plurality of petal assemblies, the launch restraint assembly adapted to apply a preload to the DMMSPA panels to deform each of the DMMSPA panels from the undeformed V-configuration into a deformed and substantially flat configuration;
   wherein, when the DMMSPA panels are stacked and sandwiched with the launch restraint assembly prior to deployment release of the launch restraint assembly removes the preload on the flattened DMMSPA panels so that each of the DMMSPA panels can subsequently morph from the deformed and substantially flat configuration towards the undeformed V-configuration.

2. The DMMSA of claim 1 and further comprising:
a plurality of integral cups and cones located along an axial center line of at least two of the plurality of petal assemblies; and
a plurality of snubbers spaced away from the axial center line of at least two of the plurality of petal assemblies.

3. The DMMSA of claim 1 wherein the RSDM includes a spacecraft interface bracket securable to a spacecraft and a clevis pivotally connected to the spacecraft interface bracket wherein the clevis is initially positioned ninety degrees (90°) to the bracket and movable approximately ninety degrees (90°) relative to the bracket.

4. The DMMSA of claim 1 wherein the launch restraint assembly includes a vehicle interface spider that is mountable to a spacecraft, a spider link mounted to the vehicle interface spider, a swing spider pivotally mounted to the spider link, and a hold down and release bolt joining the vehicle interface spider and the swing spider, further wherein after release of the hold down and release bolt, the swing spider moves away from the plurality of petal assemblies, thereby removing the preload from the plurality of petal assemblies.

5. The DMMSA of claim 1 wherein the RSDM includes:
at least one constant force spring mounted on an output drum that feeds into a storage drum, the constant force spring for use in deploying the petal assemblies; and
a rotary viscous damper for controlling the rate of deployment.

6. The DMMSA of claim 1 wherein the RSDM includes motors with gear heads.

7. The DMMSA of claim 1 wherein each of the plurality of petal assemblies includes a petal yoke located between the at least one DMMSPA panel and the RSDM.

8. The DMMSA of claim 1 and further comprising:
a petal-to-petal lanyard located between each pair of immediately adjacent petal assemblies of the plurality of petal assemblies, for transmitting a force being applied to one of the plurality of
petal assemblies that has rotated about the axis to the immediately adjacent one of the plurality of petal assemblies that has not rotated about the axis to cause the immediately adjacent one of the plurality of petal assemblies to start rotating about the axis.

9. The DMMSA of claim 1 wherein at least one of the plurality of petal assemblies includes a first DMMSPA panel that extends over a first radial range relative to the axis when deployed, a second DMMSPA panel that extends over a second radial range relative to the axis when deployed that is greater than the first radial range, and a hinge operatively connecting the first DMMSPA panel to the second DMMSPA panel.

10. The DMMSA of claim 1 wherein the at least one DMMSPA panel includes a first portion with a first edge that is substantially parallel to a radial line from the axis, a second portion with a second edge that is substantially parallel to a radial line from the axis, and a hinge extending between the first and second edges.

11. The DMMSA of claim 3 and further comprising:
a torsion spring connecting the spacecraft interface bracket to the clevis and biasing the clevis in a direction towards the bracket.

12. A deployable morphing modular solar array (DMMSA), the DMMSA comprising:
a root staging and deployment mechanism (RSDM) mountable to a spacecraft;
a plurality of petal assemblies rotatably secured to the RSDM for rotation about an axis, each of the plurality of petal assemblies adapted to rotate about a different location along the length of the axis, each petal assembly having at least one deployable morphing modular solar power assembly (DMMSPA) panel, and each DMMSPA panel having an undeformed V-configuration in a cross-sectional plane that is perpendicular to a radius extending from the axis;
a launch restraint assembly for stacking and sandwiching the plurality of petal assemblies prior to deployment, the launch restraint assembly preloading each of the at least one DMMSPA panel associated with each of the plurality of petal assemblies, the launch restraint assembly adapted to apply a preload to the DMMSPA panels to deform each of the DMMSPA panels from the undeformed V-configuration into a deformed and substantially flat configuration; and
wherein, when the plurality of petal assemblies are stacked and sandwiched with the launch restraint assembly, the release of the launch restraint assembly places the stacked and sandwiched petal assemblies in condition to rotate about the axis and each DMMSPA panel in condition to elastically morph from the deformed and substantially flat configuration towards the undeformed V-configuration.

13. The DMMSA of claim 12 and further comprising:
a plurality of integral cups and cones located along an axial center line of at least two of the plurality of petal assemblies; and
a plurality of snubbers spaced away from the axial center line of at least two of the plurality of petal assemblies.

14. The DMMSA of claim 12 wherein the RSDM includes a spacecraft interface bracket securable to a spacecraft and a clevis pivotally connected to the bracket, the clevis initially positioned ninety degrees (90°) away from the bracket and movable approximately ninety degrees (90°) to a parallel position with the bracket.

15. The DMMSA of claim 12 wherein the launch restraint assembly includes a vehicle interface spider mountable to a spacecraft, a spider link member mounted to the vehicle interface spider, a swing spider pivotally mounted to the spider link member, and a hold down and release bolt joining the vehicle interface spider and the swing spider, further wherein after release of the hold down and release bolt, the swing spider moves away from the plurality of petal assemblies thereby removing the preload from the plurality of petal assemblies.

16. The DMMSA of claim 12 wherein each of the plurality of petal assemblies includes a petal yoke located between the at least one DMMSPA panel and the RSDM.

17. The DMMSA of claim 12 and further comprising:
a petal-to-petal lanyard located between each pair of immediately adjacent petal assemblies of the plurality of petal assemblies, the petal-to-petal lanyard for transmitting a force being applied to one of the plurality of petal assemblies that has rotated about the axis to the immediately adjacent one of the plurality of petal assemblies that has not rotated about the axis to cause the immediately adjacent one of the plurality of petal assemblies to start rotating about the axis.

18. The DMMSA of claim 12 wherein at least one of the plurality of petal assemblies includes a first DMMSPA panel that extends over a first radial range relative to the axis when deployed, a second DMMSPA panel that extends over a second radial range relative to the axis when deployed that is greater than the first radial range, and a hinge operatively connecting the first DMMSPA panel to the second DMMSPA panel.

19. The DMMSA of claim 12 wherein the at least one DMMSPA panel includes a first portion with a first edge that is substantially parallel to a radial line from the axis, a second portion with a second edge that is substantially parallel to a radial line from the axis, and a hinge extending between the first and second edges.

20. The DMMSA of claim 14 and further comprising:
   a torsion spring connecting the spacecraft interface bracket to the clevis and biasing the clevis in a direction towards the bracket.

\* \* \* \* \*

UNITED STATES PATENT AND TRADEMARK OFFICE
CERTIFICATE OF CORRECTION

| | | |
|---|---|---|
| PATENT NO. | : 8,814,099 B1 | Page 1 of 1 |
| APPLICATION NO. | : 13/199430 | |
| DATED | : August 26, 2014 | |
| INVENTOR(S) | : Thomas Jeffrey Harvey et al. | |

It is certified that error appears in the above-identified patent and that said Letters Patent is hereby corrected as shown below:

In the Specification,

At column 1, line 46, delete "multi junction" and insert --multi-junction--; and
        line 48, delete "ultra-high Performance" and insert --ultra-high performance--.

In the Claims,

At column 6, line 65, claim 1, delete "depolyment" and insert --deployment--.

At column 7, line 11, claim 3, following "bracket", insert --,--; and
        line 38, claim 8, following "petal assemblies,", insert --the petal-to-petal lanyard--.

Signed and Sealed this
Sixteenth Day of December, 2014

Michelle K. Lee
*Deputy Director of the United States Patent and Trademark Office*